United States Patent [19]

Novacek

[11] Patent Number: 4,827,978

[45] Date of Patent: May 9, 1989

[54] FLUID CONTROLLER WITH REDUCED STEERING WHEEL PRECESSION

[75] Inventor: William J. Novacek, Bloomington, Minn.

[73] Assignee: Eaton Corporation, Cleveland, Ohio

[21] Appl. No.: 252,619

[22] Filed: Oct. 3, 1988

[51] Int. Cl.$^4$ ............................................. F15B 13/04
[52] U.S. Cl. ................................. 137/625.24; 60/384; 91/467
[58] Field of Search ........................... 60/384; 91/467; 137/625.24

[56] References Cited

U.S. PATENT DOCUMENTS 4,037,620 7/1977 Johnson .
4,212,229 7/1980 Johnson .

Primary Examiner—Gerald A. Michalsky
Attorney, Agent, or Firm—L. J. Kasper

[57] ABSTRACT

A fluid controller (15) is disclosed for controlling the flow of fluid to fluid pressure operated devices such as a vehicle steering cylinder (17). The controller is of the type including a valve spool (35) and a valve sleeve (37) in which the various ports, passages and fluid paths are non-symmetrical. Metered, pressurized fluid is communicated through axial slots (85) in the valve spool and is communicated through cylinder ports (73) for a right turn condition, or through cylinder ports (75) for a left turn condition. The right turn cylinder ports (73) are located further axially than are the left turn cylinder ports (75) from the end of the spool and sleeve which communicate with the return port. As a result, metered, pressurized fluid has a longer leakage path for a right turn than for a left turn. In accordance with the invention, the timing of the variable return flow control orifice (A5-R) is advanced, relative to the timing of the variable return flow control orifice (A5-L) to compensate for the unequal leakage paths in the right and left turn conditions, thereby substantially eliminating steering wheel precession.

9 Claims, 6 Drawing Sheets

FLUID CONTROLLER WITH REDUCED STEERING WHEEL PRECESSION

BACKGROUND OF THE DISCLOSURE

The present invention relates to fluid controllers of the type used to control the flow of fluid from a source of pressurized fluid to a fluid pressure operated device, such as a steering cylinder.

Fluid controllers of the type to which the present invention applies are typically used to control the flow of fluid to the steering cylinder of vehicles such as agricultural tractors. Many such tractors are used as row crop tractors, which involves driving the tractor along the entire length of a straight row of a particular crop, while performing some agricultural function, such as harvesting.

For as long as such controllers have been utilized in steering systems of such tractors, it has been noticed by the vehicle operator that in order to steer a straight path along the row, the neutral position of the steering wheel does not remain constant, but gradually "precesses", i.e., it rotates in one direction or the other from the original centered position. Such steering wheel precession is considered by the vehicle manufacturer to be a very undesirable characteristic of the steering system, and particularly of the controller, partly because the tendency is for the vehicle operator to believe that there is a malfunction of the steering system.

The assignee of the present invention has provided one partial solution to the problem of steering wheel precession by developing and providing commercially a fluid controller in which the valving and the various ports and passages therein are substantially symmetrical about a central reference plane. See U.S. Pat. Nos. 4,037,620 and 4,212,229, both of which discuss the problem of steering wheel precession. However, the symmetrical valving design disclosed in the above cited patents is in use commercially in only the relatively larger and more expensive fluid controllers (i.e., those in the 20-50 gpm range). Typical agricultural tractors which are driven along a straight row of crops as described above typically use relatively smaller, less expensive fluid controllers (i.e., in the 3-15 gpm range), and such controllers continue to utilize the more conventional, non-symmetrical type of valving.

In producing controllers of the type to which this invention relates, it has for many years been an objective of the assignee of the present invention to carefully tune or balance the timing or phasing of the key flow control orifices, which are the main variable flow control orifice for both right turn and left turn conditions (hereinafter, A1-R and A1-L) and the return flow control orifice for both right turn and left turn conditions (hereinafter, A5-R and A5-L). This tuning or balancing has been accomplished for many years by means of an air pressure test, during the assembly of the controller, the purpose of which has been to insure that all four of the above-noted orifices begin to open at substantially the same timing (i.e., in terms of degrees of relative rotation between the valve spool and valve sleeve). If a discrepancy was noted in the timing, a correction would be made. For example, if the timing of the A1-L orifice lagged the others by a fraction of a degree, there would be additional machining (grinding) performed on the wall of one of the axial slots comprising that orifice, as a result of which its timing would be advanced to be substantially equal to that of the other orifices. Until the time of the present invention, it has been believed that one important reason for tuning or balancing the timing of these orifices was to keep the problem of steering wheel precession from becoming worse than it already was.

SUMMARY OF THE INVENTION

Accordingly, it is an object of the present invention to provide an improved fluid controller of the non-symmetrical valving type, whereby the steering wheel precession of the overall steering system is substantially reduced.

The above and other objects of the invention are accomplished by the provision of an improved fluid controller of the type including a housing means defining an inlet port for connection to the source of fluid, a return port, and first and second control fluid ports for connection to the steering cylinder. A valve means disposed in the housing includes a primary valve member and a follow-up valve member, the valve members defining a neutral position and first and second operating positions. In the first operating position, the housing means and the valve means cooperate to define a first main fluid path from the inlet to the first control fluid port and from the second control fluid port to the return port. In the second operating position, the housing means and the valve means cooperate to define a second main path from the inlet port to the second control fluid port and from the first control fluid port to the return port. A fluid actuated means imparts follow-up valve movement in response to the flow of fluid through either the first or second main fluid path. The first and second main fluid paths define first and second variable flow control orifices disposed toward one axial end of the valve means, and communication between the valve means and the return port occurs toward the other axial end of the valve means. The first main fluid path defines a first variable cylinder control orifice between the fluid actuated means and the first control port, and the second main fluid path defines a second variable cylinder control orifice disposed between the fluid actuated means and the second control fluid port, the first variable cylinder control orifice being disposed axially further from the other axial end of the valve means than is the second variable cylinder control orifice. The first main fluid path defines a first variable return flow control orifice disposed between the second control fluid port and the return port, and the second main fluid path defines a second variable return flow control orifice disposed between the first control fluid port and the return port.

The improved controller is characterized by the first variable flow control orifice being disposed to begin to open at a rotational displacement of X degrees as the valve members are displaced from the neutral position toward the first operating position. The second variable return flow control orifice is disposed to begin to open at a rotational displacement of Y degrees as the valve members are displaced from the neutral position toward the second operating position. X degrees is less than Y degrees, whereby the first main fluid path begins to communicate with the return port sooner than does the second main fluid path to compensate for unequal leakage paths caused by the first variable cylinder control orifice being disposed further from the other axial end of the valve means than is the second variable cylinder control orifice, thereby to substantially eliminate the steering wheel precession.

DESCRIPTION OF THE PREFERRED EMBODIMENT

Figure 1:
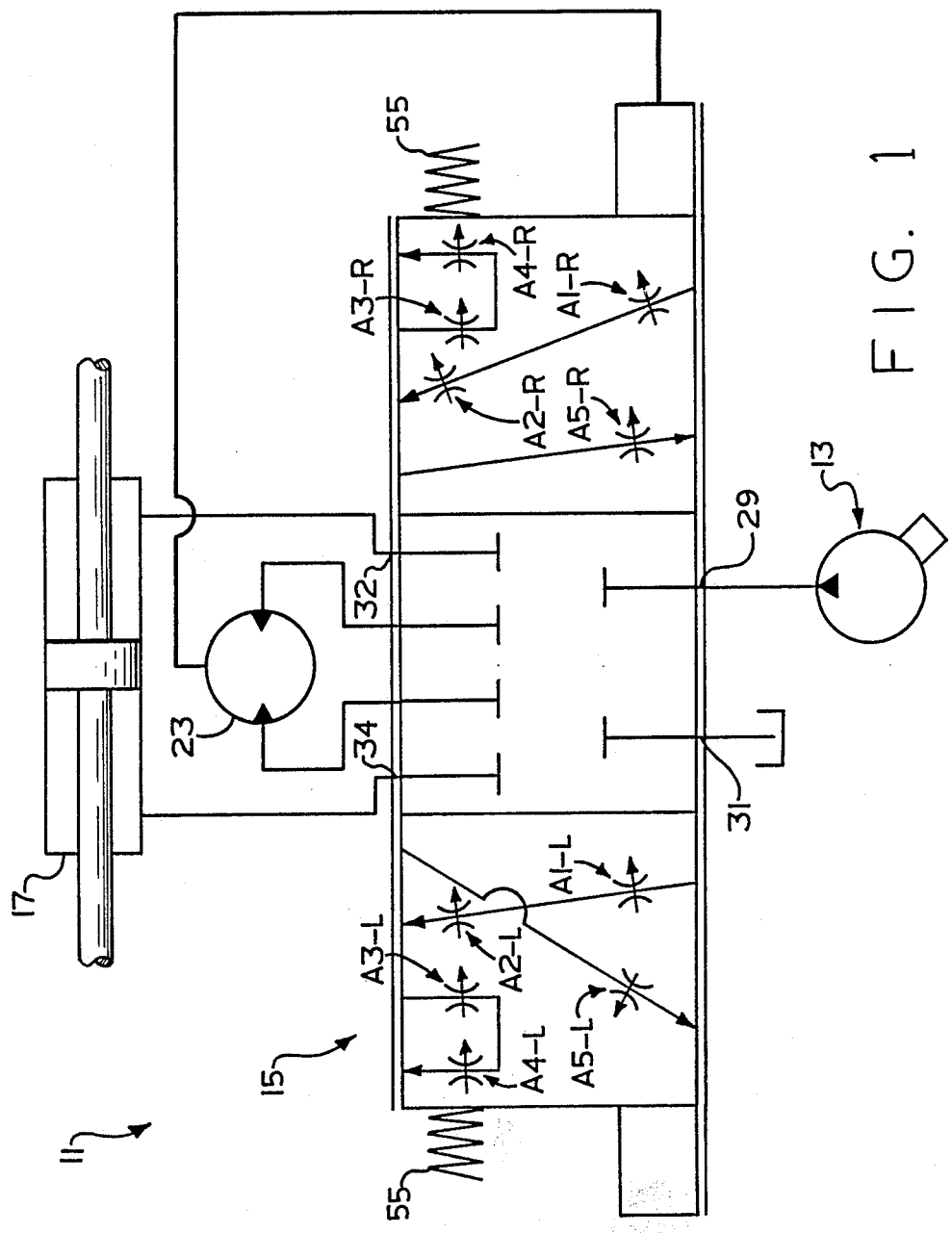
FIG. 1 is a schematic of a typical hydraulic circuit including a fluid controller made in accordance with the present invention.

Referring now to the drawings, which are not intended to limit the present invention, FIG. 1 illustrates schematically a typical hydraulic circuit of the type with which the present invention may be used. The circuit comprises a hydrostatic power steering system, generally designated 11, which is supplied with pressurized fluid by a pressure compensated, variable displacement pump 13, the compensator portion of which is shown only in schematic form, as its operation is well known in the art and forms no part of the present invention.

Figure 2:
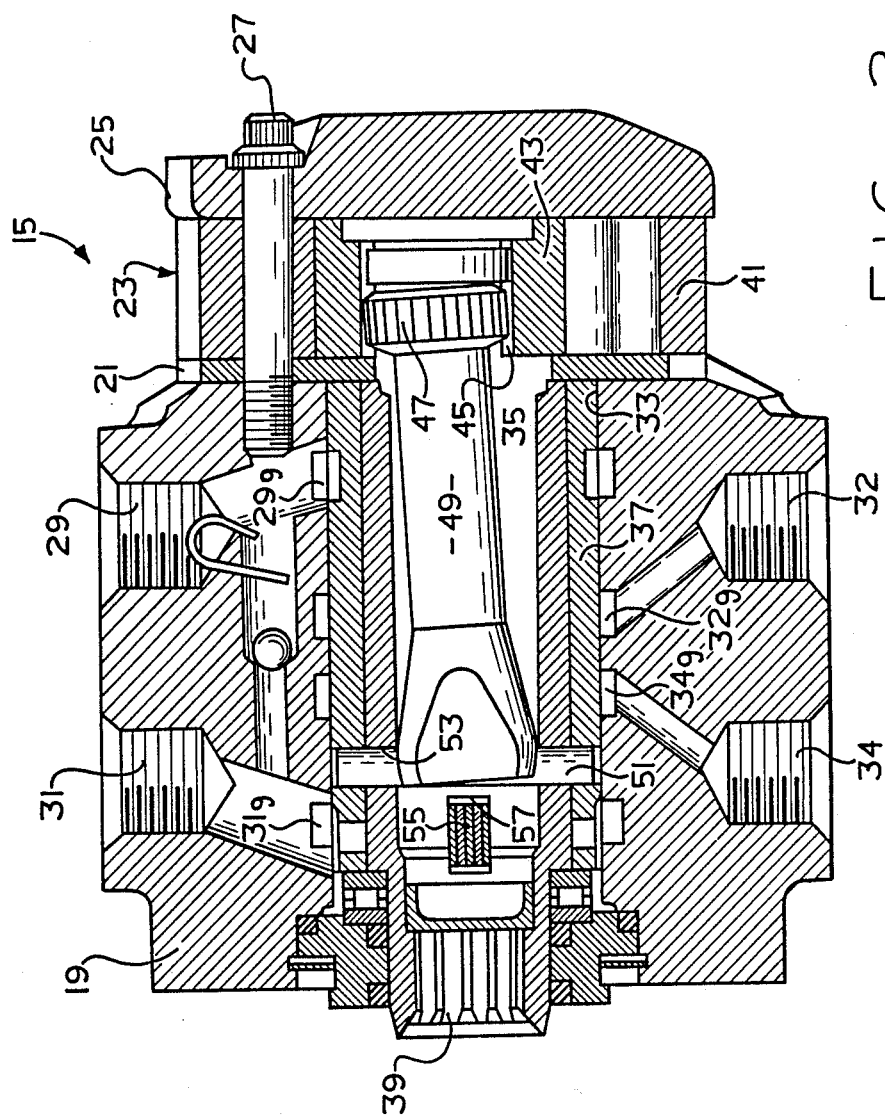
FIG. 2 is an axial cross-section of the controller shown schematically in FIG. 1.

The output from the pump 13 is fed to a steering control valve, generally designated 15, which is shown in greater detail in FIG. 2. The steering control valve 15 (controller) directs the flow of pressurized fluid to either the right end or the left end of a power steering cylinder 17 in response to rotation of a vehicle steering wheel (not shown) in the appropriate direction. Certain details of the controller 15 shown schematically in FIG. 1 will be referenced in connection with the subsequent description of FIGS. 2-4.

Referring now to FIG. 2, the controller 15, which will be described only briefly herein, may be seen in greater detail, and its operation better understood, by reference to U.S. Pat. No. 3,801,239 which is assigned to the assignee of the present invention, and incorporated herein by reference. The controller 15 is comprised of several sections, including a housing 19, a port plate 21, a fluid meter 23, and an end plate 25. These sections are held together in tight sealing engagement by means of a plurality of bolts 27 which are in threaded engagement with the housing 19.

The housing 19 defines a fluid inlet port 29, a fluid return port 31, and a pair of control fluid ports 32 and 34 which, as shown in FIG. 1, are connected to the opposite ends of the cylinder 17. The housing 19 further defines four annular grooves 29g, 31g, 32g, and 34g, which are in open, relatively unrestricted fluid communication with the fluid ports 29, 31, 32 and 34, respectively.

Rotatably disposed within a valve bore 33 defined by the housing 19 is the valving shown schematically in FIG. 1, which comprises a primary, rotatable valve member 35 (spool) and a cooperating, relatively rotatable follow-up valve member 37 (sleeve). The forward end of the spool 35 includes a portion having a reduced diameter and defining a set of internal splines 39 which provide for a direct mechanical connection between the spool 35 and the steering wheel. The spool 35 and sleeve 37 will be described in greater detail subsequently.

The fluid meter 23, in the subject embodiment, comprises a gerotor gear set including an internally toothed stator 41 and an externally toothed rotor 43. The rotor 43 defines a set of internal splines 45, and in splined engagement therewith is a set of external splines 47, formed at the rearward end of a drive shaft 49. The shaft 49 has a bifurcated forward end permitting driving connection between the shaft 49 and the sleeve 37 by means of a pin 51 passing through a pair of circumferentially-elongated pin openings 53 in the spool 35. Thus, pressurized fluid flowing through the valving in response to the turning of the spool 35 flows to the fluid meter 23 causing orbital and rotational movement of the rotor 43 (metering member) within the stator 41. Such movement of the rotor 43 causes follow-up movement of the sleeve 37 by means of the drive shaft 49 and pin 51, to maintain an appropriate relative displacement between the spool 35 and sleeve 37, for any particular rate of rotation of the steering wheel. A plurality of leaf springs 55, extending through spring openings 57 in the spool 35, urges the sleeve 37 toward the neutral position, relative to the spool 35.

Figure 3:
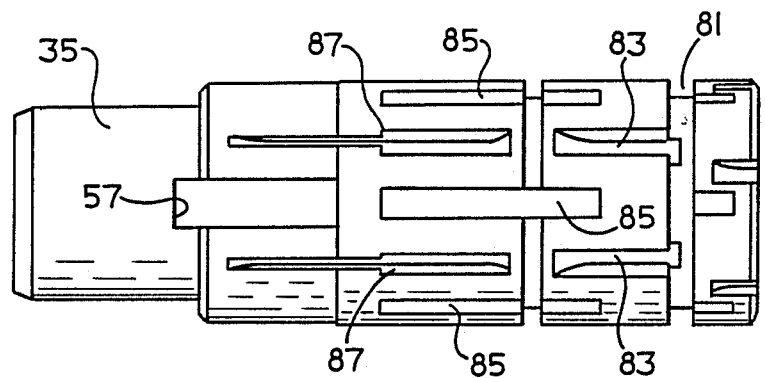
FIG. 3 is an elevation view of the primary valve member utilized in the controller of FIG. 2.
Figure 4:
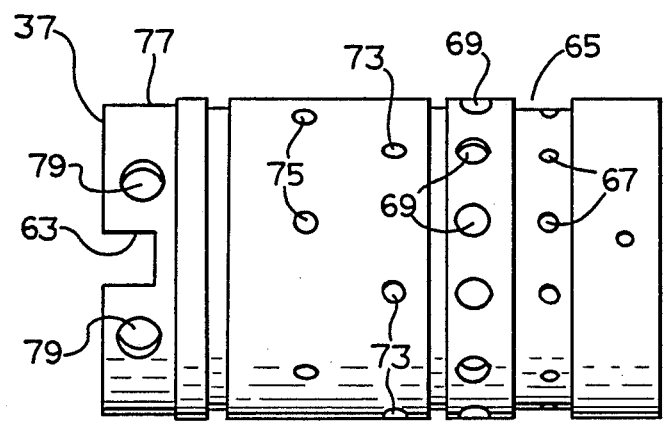
FIG. 4 is an elevation view of the follow-up valve member utilized in the controller of FIG. 2.

Referring now to FIGS. 3 and 4, the spool 35 and sleeve 37 may be seen in greater detail. It should be noted that in FIGS. 3 and 4, the spool 35 and sleeve 37 are shown in their proper relative axial position, i.e., the right end surface of both lie in the same plane. In addition, the spool 35 and sleeve 37 are shown in their proper relative rotational position to define therebetween the neutral condition illustrated schematically in FIG. 1.

Referring now more specifically to FIG. 4, it may be seen that the sleeve 37 defines a pair of diametrically-opposed openings 63 through which the leaf springs 55 extend radially outwardly. The sleeve 37 defines an annular groove 65 disposed axially to be in continuous fluid communication with the annular groove 29g. Disposed in fluid communication with the groove 65 is a plurality of ports 67 which, in the neutral position, have communication therethrough blocked by the outer surface of the spool 35. To the left of the annular groove 65 is a plurality of meter ports 69 which communicate between the valving and the expanding and contracting volume chambers of the fluid meter 23 by means of a plurality of axial bores defined by the housing 19 (not shown in FIG. 2). Disposed to the left of the meter ports in FIG. 4 is a plurality of cylinder ports 73 and a plurality of cylinder ports 75 disposed such that when the ports 73 communicate metered fluid to one end of the cylinder 17, the ports 75 receive return fluid from the opposite end of the cylinder 17. At its left end, the sleeve 37 includes a portion 77 having a slightly reduced diameter, such that an annular passage is defined between the valve bore 33 and the reduced portion 77, which defines a plurality of tank openings 79.

Referring now to FIG. 3, the spool 35 defines an annular groove 81, and in communication therewith, a plurality of axial slots 83. When the spool 35 is displaced from the neutral position, relative to the sleeve 37, every other port 67 begins to communicate with the adjacent axial slot 83 to define therebetween a variable orifice, the composite of these individual variable orifices comprising a main variable flow control orifice A1-R or A1-L (see FIG. 1), depending upon the direction of rotation of the controller 15. Each of the axial slots 83 also communicates with one of the meter ports 69 to define therebetween a variable orifice, the composite of these individual variable orifices comprising a variable flow control orifice A2-R or A2-L, again depending upon the direction of rotation of the controller 15. Metered fluid returning from the fluid meter 23 flows through alternate ones of the meter ports 69 and enters an adjacent axial slot 85. The communication between the alternate meter ports 69 and each axial slot 85 defines a variable orifice, the composite of these individual orifices comprising a variable flow control orifice A3-R or A3-L, depending upon the direction of rotation. The axial slots 85 communicate with either the adjacent cylinder ports 73, or the adjacent cylinder ports 75, depending upon the direction of rotation of the steering wheel.

For a right turn condition, the axial slots 85 each communicate with an adjacent cylinder port 73 to define therebetween a variable orifice, the composite of these individual orifices comprising a variable cylinder control orifice A4-R. For a left turn condition, each of the axial slots 85 communicates with an adjacent cylinder port 75 to define therebetween a variable orifice, the composite of these individual variable orifices comprising a variable cylinder control orifice A4-L.

In either case, fluid returning from the cylinder 17 through whichever of the cylinder ports 73 or 75 is the return then flows through the respective axial slot 87. In a right turn condition, each of the cylinder ports 75 communicates with the adjacent axial slot 87 to define therebetween a variable orifice, the composite of these individual orifices comprising a variable return flow control orifice A5-R. In the left turn condition, the cylinder ports 73 communicate with the adjacent axial slots 87 to define therebetween a variable orifice, the composite of these individual variable orifices comprising a return flow control orifice A5-L.

The left end of each of the axial slots 87 communicates with one of the openings 79, such that this return fluid flows through the annular passage surrounding the portion 77, then through the annular groove 31g to the fluid return port 31, from where it flows back to the system reservoir (see FIG. 1). The above-described flow paths are typically referred to as the main fluid paths of the controller.

Figure 5:
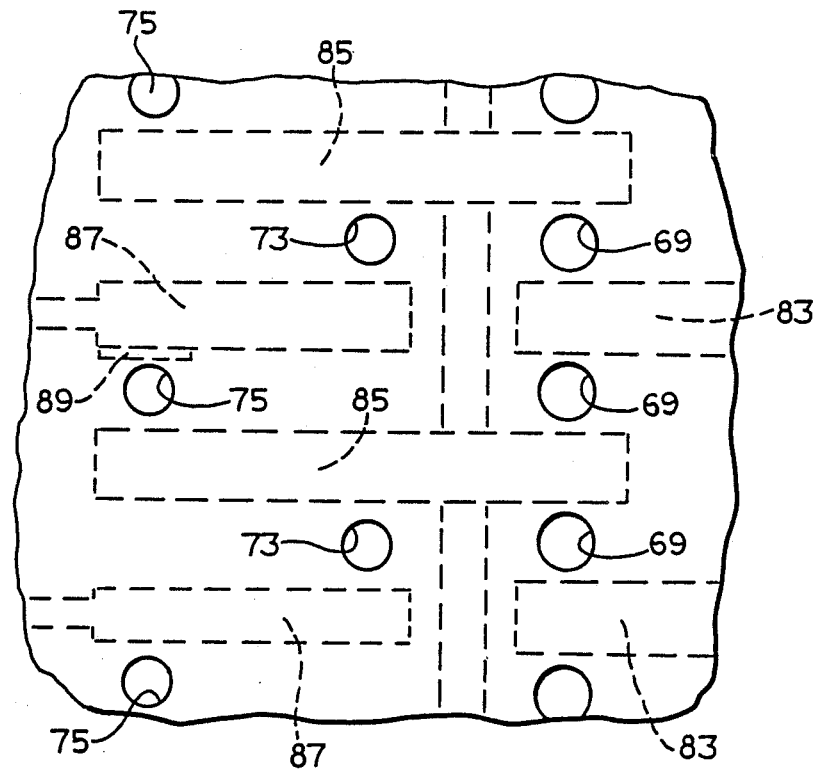
FIG. 5 is an enlarged, fragmentary layout view showing the valving interface of the primary and follow-up valve members of FIGS. 3 and 4.

It should be noted that all of the structure described up to this point is well known in connection with controllers of the type sold commercially by the assignee of the present invention. Referring now to FIG. 5, in conjunction with FIGS. 2-4, the problem overcome by the present invention will be described. As is well known to those skilled in the art, in the case of a right turn, pressurized, metered fluid is communicated through the axial slots 85 into the cylinder ports 73. The axial leakage path, between the spool 35 and sleeve 37 and between the sleeve 37 and the spool bore 33, would typically be in excess of one inch. However, in the case of a left turn, pressurized, metered fluid is communicated through the axial slots 85 to the cylinder ports 75, in which case the axial leakage path (to the reduced portion 77 and tank openings 79) would be just over one half of an inch. Therefore, in controllers of the type illustrated in FIG. 2, the leakage path is substantially shorter in the left turn condition than in the right turn condition.

As one aspect of the present invention, it has been hypothesized that the above-described difference in the length of leakage path for right and left turn conditions is related to the phenomenon of steering wheel precession. The term "precession" has been derived from the operating situation in which it is desired by the vehicle operator to steer a straight path, over a substantial distance, and it is observed by the operator that steering a straight path is not achieved by small deflections of the steering wheel about the centered position, but instead, in order to maintain the straight path, it is necessary to continually deflect the steering wheel further and further in one direction or the other. In other words, the steering wheel gradually "precesses" in one direction or the other.

Figure 6:
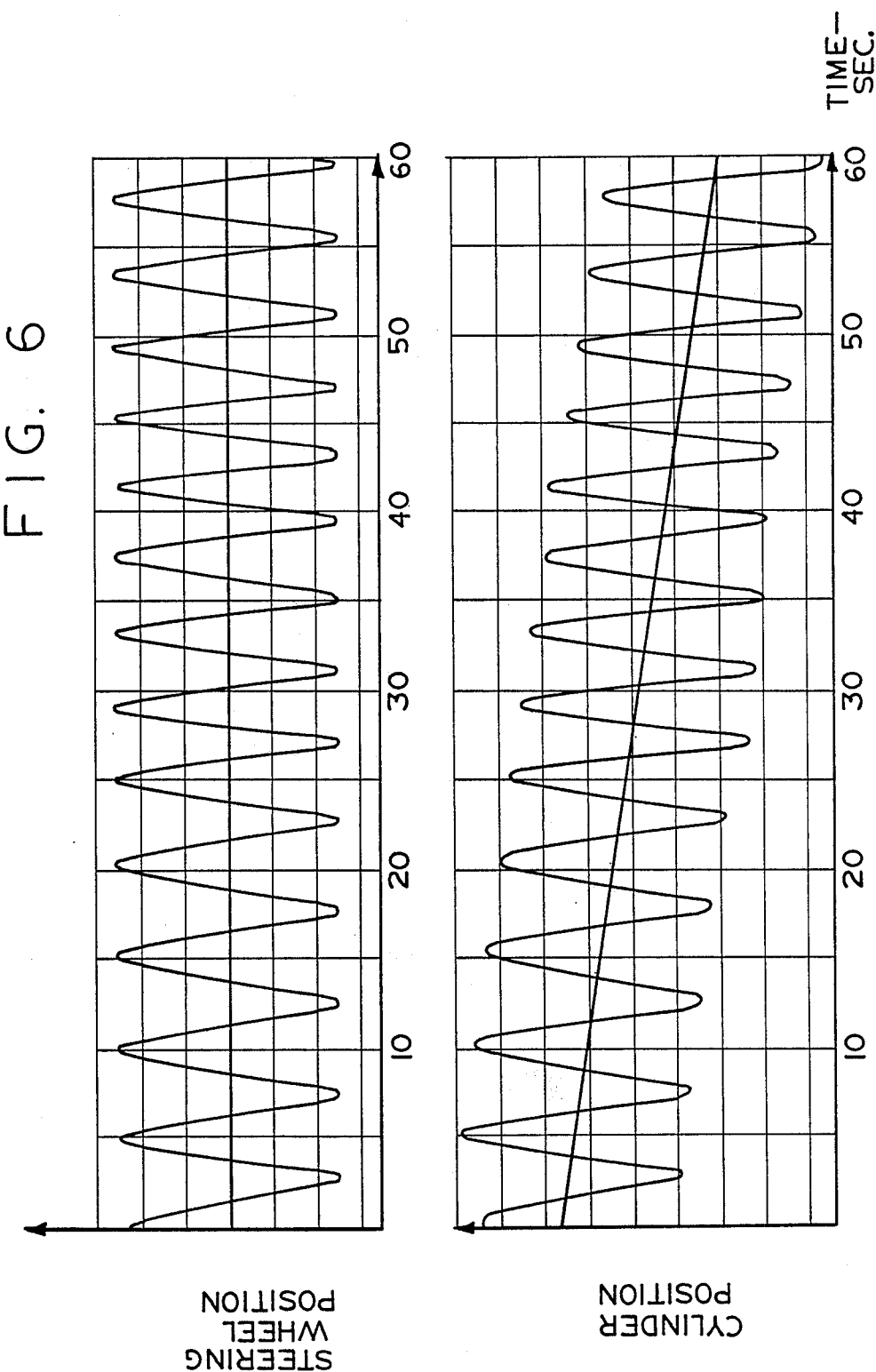
FIGS. 6 and 7 are graphs, taken during a steering wheel precession test, comparing steering wheel position versus steering cylinder position, with FIG. 6 representing a controller without the present invention and FIG. 7 representing a controller with the present invention.

Referring now to FIG. 6, there is illustrated a pair of graphs generated as part of a steering wheel precession test, with FIG. 6 representing a fluid controller not including the present invention. This test was performed with the steering wheel attached to a fixture, the purpose of which was to rotate the steering wheel by first turning it 35 degrees from neutral in the counterclockwise direction (descending portion of graph), then turning the wheel clockwise back toward neutral (ascending portion of graph) then past neutral 35 degrees. As would be expected, the centerline of the graph of steering wheel position is a horizontal, straight line, indicating, as expected, that the neutral position of the steering wheel remains constant.

Referring still to FIG. 6, the lower graph illustrates the steering cylinder position, and it may be seen that during this particular precession test, the steering cylinder reciprocates about its "neutral" position in a pattern which generally corresponds to that of the steering wheel. In this particular wheel precession test, the steering cylinder reciprocated, during each cycle of the steering wheel, by an amount equal to about 3.2 inches on either side of the "neutral" position of the steering cylinder. However, as may be seen in FIG. 6, the centerline of the graph of the steering cylinder position is not a horizontal line, as is desirable, but instead, is a gradually descending line. At the end of the approximately one minute precession test as represented in the graph of FIG. 6, the "neutral" position of the steering cylinder had changed by approximately 1.6 inches, or approximately one half of the travel of the cylinder from neutral. As should be understood by those skilled in the art, this wheel precession test is intended merely to illustrate the relative change in position of the steering wheel and steering cylinder, and as mentioned previously, during actual vehicle operation, the steering wheel would be continually deflected to maintain the steering cylinder in a true centered position.

Figure 5A:
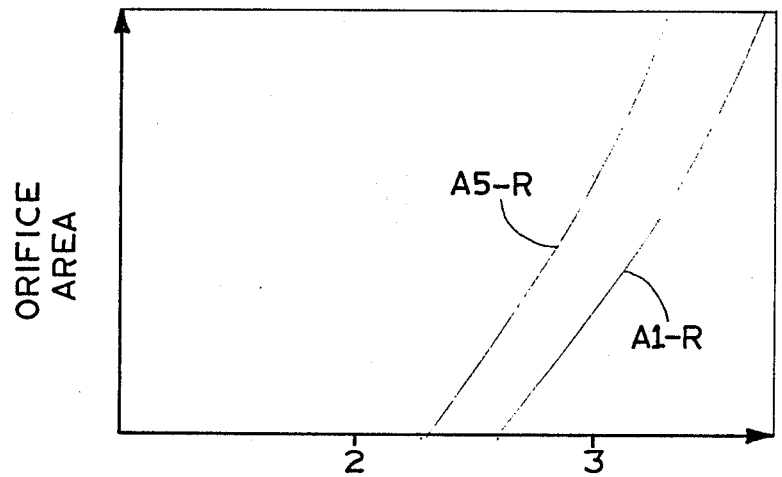
FIG. 5a is a graph of orifice area versus valve displacement for the A1 and A5 orifices in the right turn condition.

Referring again to FIG. 5, another important aspect of the present invention is the recognition that changing the valve timing for a left turn condition, relative to a right turn condition, could compensate for the difference in the length of leakage path for the left turn condition, relative to the right turn condition. More specifically, one or more of the axial slots 87 has a portion of its sidewall ground, or otherwise removed, as is generally indicated at 89, the ground portion being in a wall immediately adjacent a cylinder port 75. Referring now also to FIG. 5a, it may be seen that the result of the ground portion 89 is to advance the timing of the variable return flow control orifice A5-R, relative to the main variable flow control orifice A1-R, such that the orifice A5-R opens sooner than the orifice A1-R, rather than at substantially the same time as is typically the case.

By way of example only, in controllers previously made by the assignee of the present invention, the orifices A1-R; A5-R; A1-L; and A5-L all began to open at 2.6 degrees of relative rotation between the spool 35 and sleeve 37. As a result of the ground portion 89, the orifice A5-R now begins to open at 2.3 degrees of relative rotation of the spool 35 and sleeve 37. As a result of the change of timing of orifice A5-R, fluid begins to flow sooner from the main flow path back to the system reservoir, in a right turn condition, compensating for the fact that the length of the leakage path is longer for a right turn condition.

It is believed to be within the ability of one of ordinary skill in the art, without undue experimentation to select the ground portion 89, and therefore, the timing of the orifice A5-R, such that the leakages in the left and right turn conditions are effectively equalized.

Figure 7:
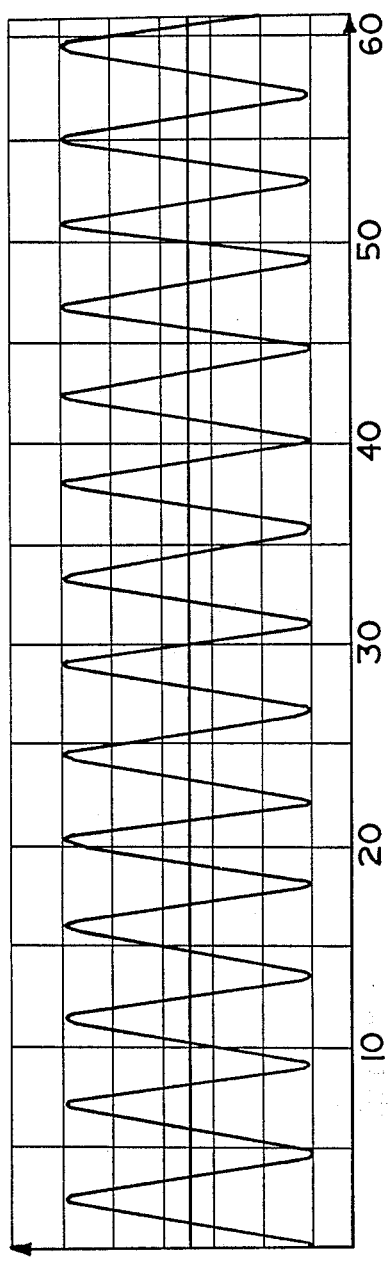
Figure 7:
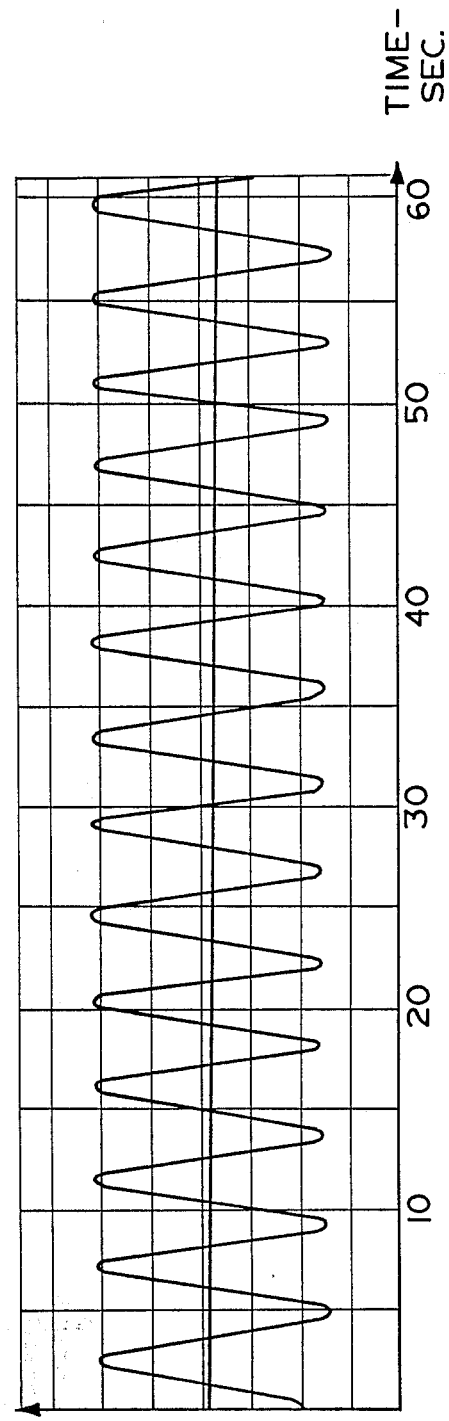

Referring now to FIG. 7, there is illustrated a pair of graphs similar to those illustrated in FIG. 6. The test procedure for the wheel precession test of FIG. 7 was identical to that for FIG. 6, and again, the upper graph illustrates the steering wheel position, while the lower graph illustrates the steering cylinder position. Again, the centerline of the graph of steering wheel position is a horizontal, straight line because the neutral position of the steering wheel remains constant in the test procedure. However, utilizing the present invention results in a substantially different graph for the steering cylinder than in FIG. 6, without the present invention. In FIG. 7, the graph of steering cylinder position again corresponds generally to the graph of steering wheel position, but with the invention the centerline remains substantially horizontal. The graph indicates that at the end of the one minute test cycle, by using a controller including the present invention, the steering cylinder "neutral" position had changed about 0.28 inches from its initial position, compared with a change of 1.6 inches using a controller not including the present invention. In other words, the use of the present invention reduced the change in steering cylinder position (which is the same as reducing steering wheel precession) by 82 percent in the particular wheel procedure represented by the graphs of FIGS. 6 and 7.

Although the preferred embodiment of the subject invention involves the provision of the ground portion 89 to advance the timing of the return flow control orifice A5-R, it should be apparent that the same result can be accomplished in various other ways. For example, one or more of the cylinder ports 75 could have its size or shape changed to achieve the object of advancing the timing of the orifice A5-R. Alternatively, the object of the invention could be achieved by delaying the timing of the return flow control orifice A5-L, relative to that of the orifice A5-R, and it is believed that substantially the same result as illustrated in the graphs of FIGS. 6 and 7 could be achieved.

Although the present invention has been described in connection with a controller of the type in which the main orifice A1 and the return orifice A5 normally open at the same time, it will be understood by those skilled in the art that there are various controller designs in which the return orifice A-5 typically opens somewhat later than the main orifice A1. In such controllers, the object of the invention could be achieved by advancing the timing of the return flow control orifice A5-R, relative to the orifice A5-L, such that the orifice A5-R opens at about the same time as the main orifice A1-R, or just slightly thereafter.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

I claim:

1. A controller operable to control the flow of fluid from a source of pressurized fluid to a fluid pressure operated device; said controller being of the type including housing means defining an inlet port for connection to the source of pressurized fluid, a return port, and first and second control fluid ports for connection to the fluid pressure operated device; valve means disposed in said housing means, and including a primary, rotatable valve member and a relatively rotatable follow-up valve member, said valve members defining a neutral position and first and second operating positions, in said first operating position said housing means and said valve means cooperating to define a first main fluid path providing fluid communication from said inlet port to said first control fluid port, and from said second control fluid port to said return port, and in said second operating position, said housing means and said valve means cooperating to define a second main fluid path providing fluid communication from said inlet port to said second control fluid port, and from said first control fluid port to said return port; fluid actuated means for imparting follow-up valve member movement in response to the flow of fluid through one of said first and second main fluid paths; said first and second main fluid paths defining first and second main variable flow control orifices, respectively, disposed toward one axial end of said valve means, communication between said valve means and said return port occurring toward the other axial end of said valve means; said first main fluid path defining a first variable cylinder control orifice disposed between said fluid actuated means and said first control fluid port, and said second main fluid path defining a second variable cylinder control orifice disposed between said fluid actuated means and said second control fluid port, said first variable cylinder control orifice being disposed axially further from said other axial end of said valve means than said second variable cylinder control orifice; said first main fluid path defining a first variable return flow control orifice disposed between said second control fluid port and said return port, and said second main fluid path defining a second variable return flow control orifice disposed between said first control fluid port and said return port; characterized by:
   (a) said first variable return flow control orifice being disposed to begin to open at a rotational displacement of X degrees as said valve members are displaced from said neutral position toward said first operating position;
   (b) said second variable return flow control orifice being disposed to begin to open at a rotational displacement of Y degrees as said valve members are displaced from said neutral position toward said second operating position;

(c) X degrees being less than Y degrees, whereby said first main fluid path begins to communicate with said return port sooner than does said second main fluid path to compensate for unequal leakage paths caused by said first variable cylinder control orifice being disposed further from said other axial end of said valve means than said second variable cylinder control orifice.

2. A controller as claimed in claim 1 characterized by said relatively rotatable follow-up valve member comprising a hollow, generally cylindrical sleeve valve member surrounding said primary valve member.

3. A controller as claimed in claim 2 characterized by said primary, rotatable valve member comprising a hollow, generally cylindrical spool valve member.

4. A controller as claimed in claim 3 characterized by said primary valve member defining a first plurality of axially oriented slots disposed on the outer peripheral surface thereof, and said follow-up valve member defining a first plurality of ports, each extending radially through said sleeve valve member.

5. A controller as claimed in claim 4 characterized by said first plurality of axially oriented slots contain metered fluid which has flowed through said fluid actuated means, displacement of said valve means toward said first operating position resulting in overlap of said first plurality of axially oriented slots and said first plurality of ports, said overlap cumulatively defining said first variable cylinder control orifice.

6. A controller as claimed in claim 5 characterized by said follow-up valve member defining a second plurality of ports, each extending radially through said sleeve valve member, said second plurality of ports being disposed axially between said first plurality of ports and said other axial end of said valve means, displacement of said valve means toward said second operating position resulting in overlap of said first plurality of axially oriented slots and said second plurality of ports, said overlap cumulatively defining said second variable cylinder control orifice.

7. A controller as claimed in claim 6 characterized by said primary valve member defining a second plurality of axially oriented slots disposed on the outer peripheral surface thereof, said second plurality of slots being in fluid communication with said return port.

8. A controller as claimed in claim 7 characterized by displacement of said valve means toward said first operating position resulting in overlap of said second plurality of axially oriented slots and said second plurality of ports, said overlap cumulatively defining said first variable return flow control orifice.

9. A controller as claimed in claim 8 characterized by displacement of said valve means toward said second operating position resulting in overlap of said second plurality of axially oriented slots and said first plurality of ports, said overlap cumulatively defining said second variable return flow control orifice.

* * * * *